United States Patent [19]

Woods et al.

[11] 3,846,887

[45] Nov. 12, 1974

[54] DISASSEMBLY APPARATUS FOR KNOCKDOWN REEL

[75] Inventors: Glenn Woods; Anthony J. Frackowiak, both of Erie, Pa.

[73] Assignee: Hoover Ball and Bearing Company, Saline, Mich.

[22] Filed: Nov. 30, 1973

[21] Appl. No.: 420,396

[52] U.S. Cl............................................... 29/200 D
[51] Int. Cl............................................ B23p 19/00
[58] Field of Search... 29/200 D, 453, 200 R, 400 R

[56] References Cited
UNITED STATES PATENTS

| | | | |
|---|---|---|---|
| 3,014,271 | 12/1961 | Englund | 29/200 D |
| 3,822,841 | 7/1974 | Campbell | 242/115 |

Primary Examiner—Thomas H. Eager
Attorney, Agent, or Firm—Olsen & Stephenson

[57] ABSTRACT

A knockdown reel and a fixture constructed and arranged for use with the reel so that the reel can be disassembled quickly and with ease. The reel has a central tubular hub formed in two half-shell sections and end flange members that are snap-fitted onto the opposite ends of the assembled tubular hub. The fixture has a plurality of axially extending fingers which can be pressed onto one end of the reel to disconnect simultaneously the snap fittings associated with one flange member for quick removal. Similar removal of the flange member at the other end can then be carried out.

5 Claims, 5 Drawing Figures

PATENTED NOV 12 1974 3,846,887

DISASSEMBLY APPARATUS FOR KNOCKDOWN REEL

REFERENCE TO RELATED APPLICATION.

This application relates to the disclosure in the pending application of Kenneth E. Campbell, Ser. No. 309,143, filed Nov. 24, 1972, now U.S. Pat. No. 3,822,841 entitled "Knockdown Reel."

BACKGROUND OF THE INVENTION.

The present invention relates to reels of the type that are adapted to be disassembled for shipment or storage purposes and to a special fixture to facilitate the disassembly of the reel.

The aforesaid application, Ser. No. 309,143, now U.S. Pat. No. 3,822,841, discloses an improved knockdown reel which has overcome the inadequacies of the prior art and enables the reel to be shipped or stored in a disassembled state so as to realize the obvious advantages of compactness and ease of handling. There is also a desire in many instances after the reel has been used to disassemble the reel for return shipment or storage. Accordingly, there is a need for a special fixture which can be used in combination with the reel by unskilled workers or other personnel to disassemble the reel in a manner which will not damage its parts and which will enable this task to be performed with ease and in a minimum of time.

SUMMARY OF THE INVENTION.

The present invention has met the needs of the industry by providing a special fixture for use with a knockdown reel of the type disclosed in the aforesaid application, Ser. No. 309,143, now U.S. Pat. No. 3,822,841.

According to one form of the present invention, a knockdown reel and a disassembly fixture therefor are provided comprising a reel having a tubular hub member which has at its opposite ends axially extending resilient latch members adapted for simultaneous inward deflection. The latch members have locking abutments projecting radially outward adjacent to their terminal ends, and end flange members are mounted on the opposite ends of the tubular hub member, each flange member defining in its central portion a socket. The socket has a dimension for receiving in close fitting mating relation an end of the tubular hub member, and it has holes in its circumference through which the locking abutments project for locking the flange member on the hub member. The combination also includes a disassembly fixture having axially extending finger portions corresponding in numbers and spacing to the locking abutments, the finger portions defining an inner circumference corresponding to the inner circumference of the socket so that when the fixture is pressed in an axial direction onto the outer end of the socket, the fingers will depress the latch members radially inwardly sufficiently far to permit removal of the end flange member from the tubular hub member. This operation can be repeated to remove the other end flange member from the hub member.

Thereafter, the tubular hub member can be separated into its two sections, and the two end flange members and the two shell sections can be stored or shipped in this knockdown condition.

Thus, it is the object of the present invention to provide an improved combination knockdown reel and disassembly fixture therefor which will enable the knockdown reel to be disassembled in a manner that will avoid damage to the components of the reel and will enable this task to be performed with ease and in a minimum of time.

Other objects of this invention will appear in the following description and appended claims, reference being had to the accompanying drawings forming a part of this specification wherein like reference characters designate corresponding parts in the several views.

DETAILED DESCRIPTION OF THE PREFERRED EMBODIMENT.

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Figure 4:
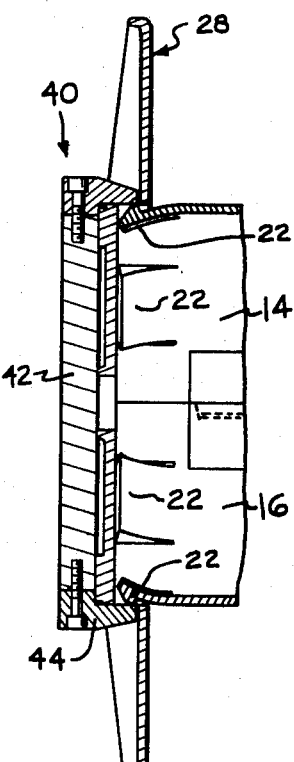
FIG. 4 is a vertical section similar to that of FIG. 3, but showing the disassembly fixture after it has been pressed onto one end of the knockdown reel.

Referring now to the drawing, the invention will be described in greater detail. Reference is made to pending application, Ser. No. 309,143, for a more specific description of the knockdown reel 10. Briefly, the knockdown reel 10 includes a tubular hub member 12 which is formed from two halfshell sections 14 and 16. The two sections 14 and 16 are formed identically the same and each has on its longitudinal edges a tongue 18 and a groove 20 so that the two half-shells 14 and 16 can be fitted together to form a tubular hub member. The opposite ends of the hub member 12 are formed with a plurality of resilient latch members 22 which are adapted to be deflected inward to the positions shown in FIG. 4. The outer terminal ends of the latch members 22 have locking abutments 24 formed thereon. The abutments project radially outward from the outer surfaces of the latch members 22 and the inner faces thereof are perpendicular to the exterior surfaces of the latch members 24 for locking engagement purposes as will be described hereinafter. The outermost corners of the locking abutments 24 are beveled as at 26 to form camming surfaces to facilitate assembly of the knockdown reel as will presently be described.

Figure 1:
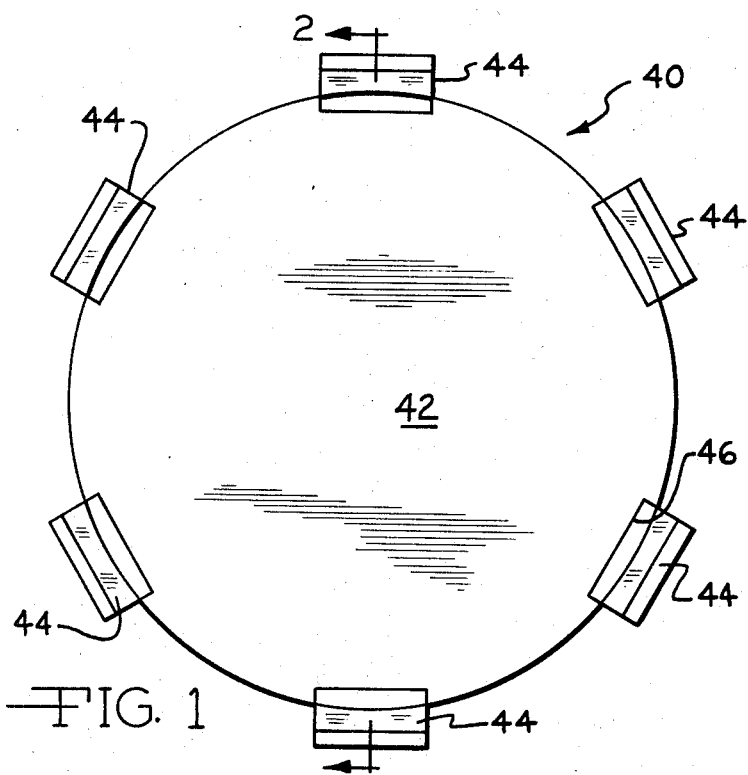
FIG. 1 is an end elevation of a disassembly fixture forming a part of the present invention.
Figure 2:
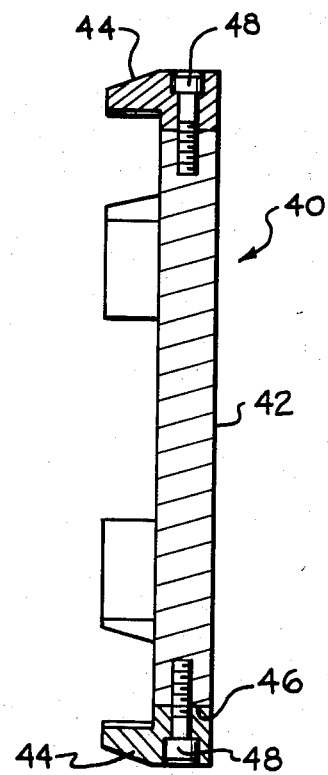
FIG. 2 is a vertical section taken on the line 2—2 of FIG. 1.
Figure 3:
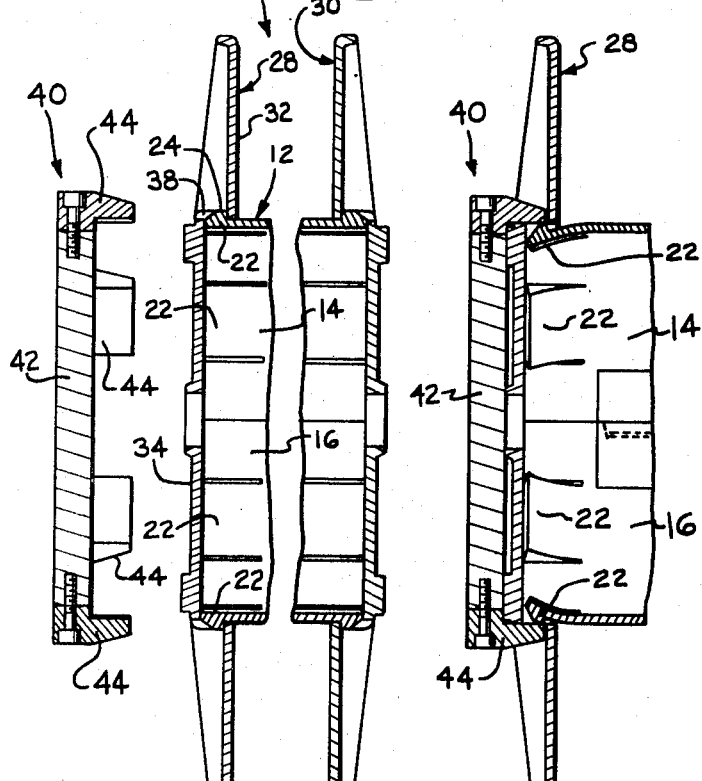
FIG. 3 is a vertical section through the disassembly fixture, similar to that of FIG. 2, and showing in fragmentary section a knockdown reel on which the fixture is to be pressed axially as a first step in disassembly of the reel.

The knockdown reel 10 also includes the one end flange member 28 and the other end flange member 30 which are adapted to be mounted on opposite ends of the tubular hub member 12. Only the flange member 28 will be described, because the flange members 28 and 30 are constructed identically the same. The flange member 28 has an annular disk portion 32 projecting radially outwardly from a socket 34. The socket 34 has an inner wall 36 which conforms to the shape and dimension of the outer surface of the hub member 12, and it has a plurality of openings or slots 38 therein corresponding in numbers and alignment with the latch members 22. Thus, the flange member 28 can be assembled onto the tubular hub member 12 merely by pressing it onto the one end of the tubular hub member 12 which will cause the latch members 22 to deflect inwardly by virtue of the camming action occurring because of the surfaces 26. The end flange member 28 will then be located on the end of the tubular hub member 12 in the position shown in FIG. 3.

Figure 5:
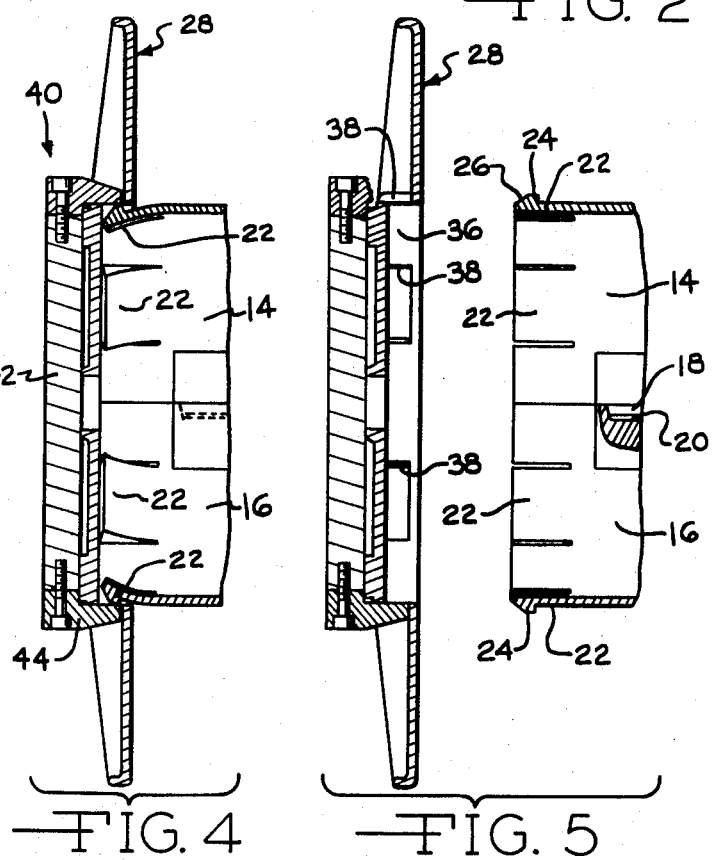
FIG. 5 is a section similar to that of FIG. 4, but showing the next step of disassembly wherein the disassembly fixture and the one end flange member have been removed from the hub of the reel.

The disassembly fixture 40 comprises a central disk portion 42 which has mounted in spaced relation around its outer circumference a plurality of finger portions 44. In the illustrated embodiment of the invention, the finger portions 44 are fastened into notches 46 in the disk portion 42 and are secured thereto by a plurality of screws 48. The finger portions 44 correspond in numbers and spacing to the locking abutments 24, and the finger portions 44 define an inner circumference corresponding to the inner circumference of the socket 34 so that when the fixture 40 is pressed onto the end of the knockdown reel to the position shown in FIG. 4, the fingers will depress the latch members 42 radially inward, as shown. This movement will be sufficiently far to permit removal of the end flange member from the tubular hub member as shown in FIG. 5. When performing this operation, the finger portions will engage the camming surface 26 initiating the inward movement of the latch members 22.

When it is desired to disassemble the knockdown reel 10, the disassembly fixture 40 will initially be used to remove the one end flange member 28, as shown in FIG. 5, and thereafter, it will be used in a similar manner in conjunction with the other end flange member 30. The two half-shell sections 14 and 16 can then be separated and these two sections together with the end flange members 28 and 30 can be suitably stored or shipped in their dissembled state.

It is claimed:

1. In combination, a knockdown reel comprising a tubular hub member having at its opposite ends axially extending resilient latch members adapted for simultaneous inward deflection, said latch members having locking abutments projecting radially outward adjacent to their terminal ends, and end flange members mounted on the opposite ends of said tubular hub member, each of said flange members defining in its central portion a socket, said socket having a dimension for receiving in close fitting mating relation an end of said tubular hub member and having holes in its circumference through which said locking abutments project for locking the flange member on said hub member, and a disassembly fixture having axially extending finger portions corresponding in numbers and spacing to said locking abutments, said finger portions defining an inner circumference corresponding to the inner circumference of said socket so that when the fixture is pressed in an axial direction onto the outer end of said socket the fingers will depress said latch members radially inwardly sufficiently far to permit removal of the end flange member from the tubular hub member.

2. The combination that is defined in claim 1, wherein said hub member comprises two identical semicircular shells having tongue-and-groove longitudinal edges for securing the shells together to define a cylindrical shape.

3. The combination that is defined in claim 1, wherein said disassembly fixture comprises a central disk portion and said finger portions are mounted in spaced relation around the outer circumference of said disk portion.

4. The combination that is defined in claim 1, wherein the holes in said socket are defined by axially extending slots which extend through the base of said socket, and said locking abutments have beveled terminal ends for engagement by the ends of said finger portions for deflection of the latch members radially inward when the finger portions are advanced onto said locking abutments.

5. The combination that is defined in claim 4, wherein each of said flange members has an annular disk portion projecting radially outward from its socket, and said fingers have an axial length sufficient to engage said annular disk portion when said disassembly fixture is pressed onto the outer end of said socket.

* * * * *